United States Patent [19]
Holder

[11] Patent Number: 5,451,065
[45] Date of Patent: Sep. 19, 1995

[54] SEAL STRUCTURES

[75] Inventor: Mark C. Holder, Mohnton, Pa.

[73] Assignee: Stein Seal Company, Kulpsville, Pa.

[21] Appl. No.: 247,329

[22] Filed: May 23, 1994

[51] Int. Cl.⁶ .............................................. F16J 15/38
[52] U.S. Cl. .................................... 277/81 R; 277/27; 277/85; 277/96.1
[58] Field of Search .................... 277/81 R, 70, 71, 75, 277/27, 96, 96.1, 96.2, 85, 173, 174

[56] References Cited

U.S. PATENT DOCUMENTS

| | | | |
|---|---|---|---|
| 3,572,727 | 3/1971 | Greinei | 277/85 |
| 4,406,466 | 9/1983 | Geary, Jr. | 277/96.1 |
| 5,014,999 | 5/1991 | Makhabey | 277/175 |
| 5,137,284 | 8/1992 | Holder | 277/85 |
| 5,174,584 | 12/1992 | Lahimar | 277/96.1 |
| 5,388,834 | 2/1995 | Sedy | 277/96.1 |

Primary Examiner—Daniel G. Depumpo
Attorney, Agent, or Firm—Zigmund L. Dermer

[57] ABSTRACT

A seal ring construction is provided wherein a seal ring which is formed from a material which is subject to distortion during operation. One end of the ring and portions of the two adjacent sides of the ring which are adjacent the one end of the ring are received in a recess of a stiff shroud assembly. An O-ring recess is formed in each of the sides of the shroud recess which coextend with the two adjacent sides of the ring. Sealing O-rings are positioned in the O-ring recesses and means are formed in the recesses to urge the O-rings into engagement with the sides of the seal ring and into engagement with the inner surface of the shroud recess. The urging means include an inclined surface in each O-ring recess which faces the innermost surface of the shroud recess. In addition, means are provided to take up dimensional differences in the shroud and O-ring components which occur in the manufacturing process.

9 Claims, 1 Drawing Sheet

SEAL STRUCTURES

BACKGROUND OF THE INVENTION

1. Field of the Invention

This invention relates to seal rings formed from generally rigid materials which are subject to deformation when employed in applications creating high differential pressures across the seal rings.

2. Description of the Prior Art

In a number of seal applications, the sealing function is accomplished by use of a seal ring formed from a material such as carbon or carbon-graphite which may be subjected to deformation when employed in an application where a high pressure difference is imparted across the seal ring. One such application is described in my U.S. Pat. No. 5,137,284, issued Aug. 11, 1992, which describes a stationary seal ring assembly for use in dry gas face seals. This patent is also assigned to Stein Seal Co. and is incorporated herein by reference. In the aforementioned patent, a stationary seal ring performs a sealing action with a movable runner mounted on a rotating shaft. The seal ring is provided with surfaces, some of which are exposed to high system pressure and others of which are exposed to lower system pressure. The seal ring may deform under these pressure loads where the differential pressure across the ring is very high. In the embodiment illustrated in my patent, such deformation is absorbed by the use of a metallic shroud or strong back which overlies one of the axial end surfaces and portions of the two radial surfaces of the seal ring. O-ring recesses are provided in the shroud and O-rings are inserted in each of the O-ring recesses to engage the adjacent surfaces of the shroud and the ring to prevent leakage. The one axial surface of the ring has a passageway extending therefrom entirely through the seal ring to a low pressure region of the seal housing to conduct any leakage through the O-rings to the low pressure region. The assembly of the O-rings, the shroud and the seal ring as described in my aforementioned patent can be improved for certain applications, e.g., for ease of assembly and to absorb small but important dimensional differences which occur in manufacture. In my patent, it is pointed out that the O-rings are pre-loaded for sealing in the axial sense only and are sized at their outer diameter to be larger than the inner diameter of the shroud to affect the seal at that location. In assembly of these components, difficulty can be encountered in that either (1) the O-rings do not seat at the sealing surfaces, or (2) the squeeze pre-load is very high due to tolerance stack-up, causing an out-of-flat condition to prevail at the sealing face. The out-of-flat condition is, of course, intolerable because effective sealing is not achieved. Furthermore, this out-of-flat condition is more serious on large diameter parts where high durometer O-rings are required to prevent extrusion and to combat explosive decompression at high operating pressure. In addition, it is to be noted that tolerance stack-up in the manufacture of the shroud, seal ring and O-rings can serve to reduce the effective seal between the O-rings and the shroud and seal ring or in other circumstances, to provide such increased forces on the seal ring as to create distortion thereof. This distortion or increased pressure on the seal ring caused by the O-rings is added to during seal operation with high pressure drops across the seal due to system operating parameters.

SUMMARY OF THE INVENTION

The present invention relates to seal ring constructions wherein a seal ring which is formed from a material which is subject to distortion during operation is provided on, for example, an axially extending surface thereof with a stiff shroud member which engages the axial surface and which overlies the seal ring and extends around part of the ring to receive within the shroud portions of, for example, the adjacent radial seal ring surfaces. The shroud is formed with O-ring receiving recesses in each of the portions of the shroud that overlie the radial surface portions of the seal ring. An O-ring is provided in each of the O-ring recesses and means are provided in each of the O-ring receiving recesses for urging the O-ring into positive engagement with the adjacent radial surface portion of the seal ring and into positive engagement with the shroud so that leakage past each of the O-rings is prevented. Means are further provided in accordance with this invention to ensure positive engagement of the O-ring with that surface of the shroud that engages the seal ring axial surface and concurrently with the radial surfaces of the seal ring. Such means includes an inclined surface located in each O-ring receiving recess which faces the junction between the seal ring axial portion and the shroud, to provide a force on the O-ring in both the radial and axial directions to ensure positive engagement between the O-ring and the shroud and the seal ring. In addition, the shroud and seal ring are formed so that passageways are provided to conduct the high pressure to those sides of the O-ring remote from the junction of the seal ring and the shroud surface so that system pressure serves to urge the O-ring into positive engagement with both the shroud and the seal ring. The invention further contemplates that at least one of the O-ring receiving components of the shroud is a removable flange mounted on the shroud by a suitable mounting means, such as a split ring clip and resilient means are interposed between the split ring clip and the removable flange to absorb any variation in dimensions of the seal ring, O-rings and/or shroud caused by manufacturing tolerances and the like.

DETAILED DESCRIPTION OF THE DRAWINGS

Figure 1:
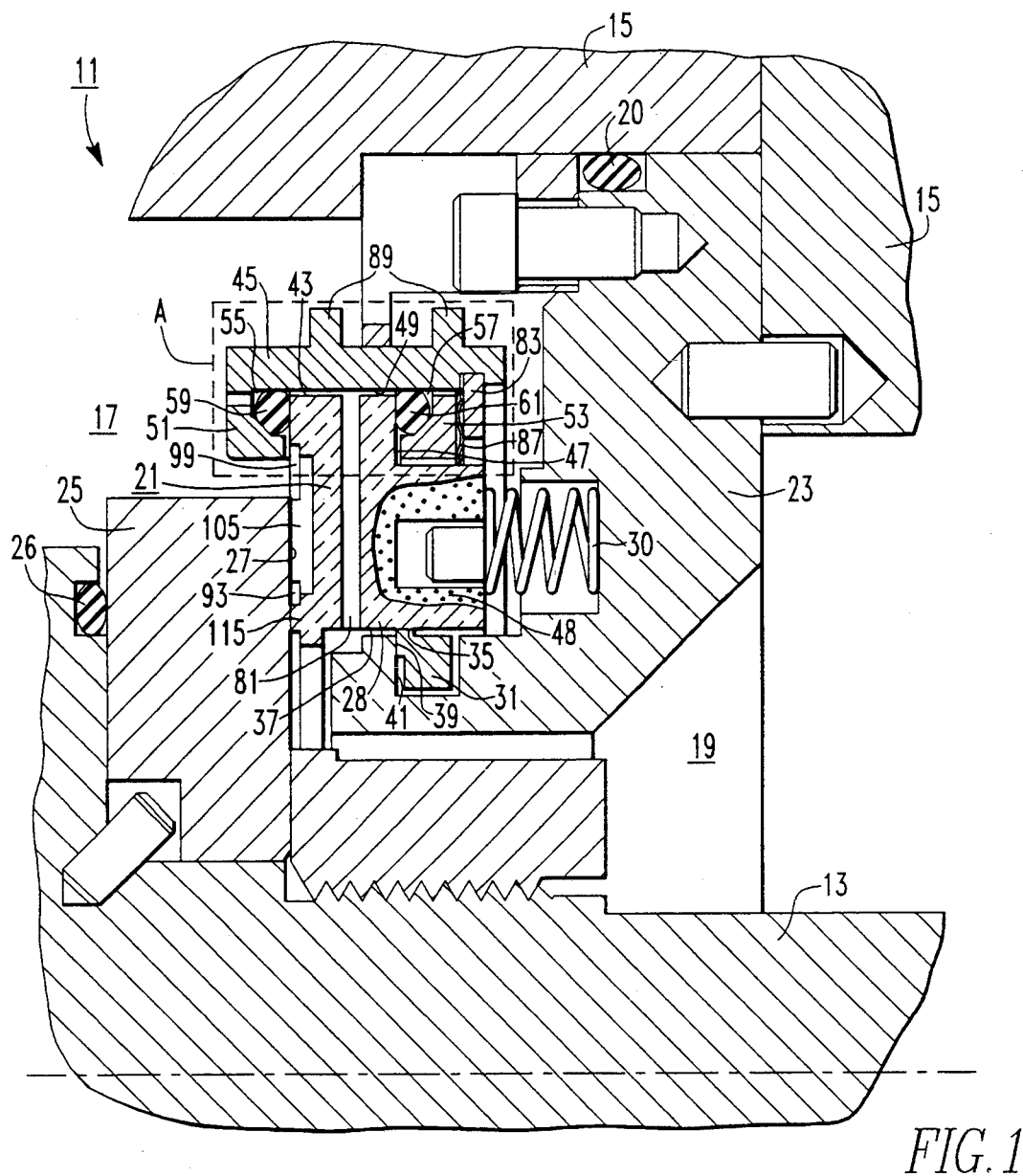
FIG. 1 is a view in section of this invention employed with a dry gas face seal assembly which has been constructed in accordance with this invention.
Figure 1A:
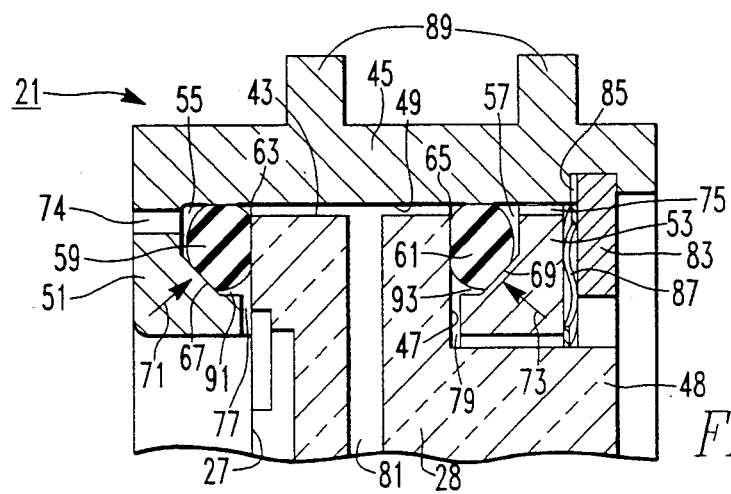
FIG. 1A is a view in section of a fragment of the stationary seal ring of FIG. 1, identified by the outline A in FIG. 1, but enlarged for clarity.

Turning now to the drawings, there is shown this invention applied to a dry gas face seal assembly of the type described and claimed in the aforesaid U.S. Pat. No. 5,137,284. In this description, however, operational details and description of the dry gas seal assembly of my prior patent will not again be described and reference thereto may be had for further details. Turning to FIGS. 1 and 1A, there is shown a face seal assembly 11 for sealing a rotating shaft 13 and a stationary casing 15 which has a high pressure side 17 and a low pressure side 19, the face seal assembly 11 comprises a stationary seal ring assembly 21 mounted on a seal housing 23 and a rotating mating ring 25 affixed to the shaft 13 which is rotatable therewith.

Only one-half of an annular seal ring assembly is shown surrounding a shaft, however, it will be understood that the remainder of the seal ring has been omitted from FIG. 1.

Housing 23 is affixed to stationary casing 15 and a static O-ring seal 20 is provided between housing 23 and casing 15 to prevent loss of gas from the high pressure side to the low pressure side through any space between housing 23 and casing 15. A static O-ring seal 26 is provided between rotatable mating ring 25 and shaft 13 to prevent the loss of gas from the high pressure side 17 to the low pressure side 19 along a path therebetween. In the seal ring assembly 21, there is provided seal ring 28 which is formed from a suitable material which provides a rubbing seal surface with the rotating runner 25, such material being carbon, a carbon-graphite, or in certain instances, other ceramics such as silicon carbide. The seal ring 28, when formed of such material, is subject to deformation both when assembled and with system pressure acting across it. Ring 28 is provided with a sealing surface 27 which coacts with a complementary surface on runner 25 to break down the pressure between high pressure region 17 and low pressure region 19 of housing 15. A secondary sealing member 31 is provided with a sealing surface 35 thereon which coacts with the adjacent axial surface 37 on seal ring 28. In addition, seal ring 31 has a sealing surface 39 which coacts with surface 41 on seal housing 23 so that seal ring 28 interacting with seal ring 31 also serve to isolate the high pressure region 17 from lower pressure region 19 within the housing 15. It can therefore be seen that seal ring 28 has a portion of its axial surface 37 located on the low pressure side of seal 31 and the remainder thereof located on the high pressure side of seal ring 31. Referring to sealing surface 27 on stationary seal ring 28, it will be appreciated that the main sealing dam is identified by the reference character 115 and that a pair of concentric circular grooves 93 and 99 are provided therein together with radial connecting cords or recesses 105 on surface 27 for purposes which are described in detail in my aforesaid U.S. Pat. No. 5,137,284. To complete the general description of the stationary seal assembly 21, there is provided a plurality of circumferentially spaced coil springs 30, only one of which is shown in FIG. 1, which urge seal ring 28 toward runner 25 to ensure contact between ring 28 and runner 25 at the sealing face 27.

Referring now in detail to the construction of seal ring 28, it will be noted that seal ring 28 includes a pair of generally parallel axially extending faces 37 and 43 with the inner face 37 having been previously described and the outer axial face 43 being positioned inwardly of a shroud member 45 to be described. Seal ring 28 also includes a pair of radially extending faces which are generally parallel to each other with face 27 having the seal dam 115 thereon having been previously described and a generally parallel face 47 being positioned to the right of face 27. Seal ring 28 includes a projection 48 extending outwardly from face 47 with the projection 48 provided to engage springs 30 and to receive mounting pins in a recess therein as described in the aforementioned patent.

The annular shroud 45 is formed from a metallic material and is designed to be a stiff member. It includes an axially extending face 49 thereon which is positioned closely adjacent but with a small yet positive clearance fit with face 43 of seal ring 28 so that shroud 45 is positioned outwardly of seal ring 28 with a small but positive clearance therebetween. Shroud 45 extends axially beyond the two radial faces 27 and 47 of seal ring 28 and includes a pair of flanges 51 and 53 which extend radially inwardly from shroud 45 toward shaft 13 and to overlie a portion of the radial faces 27 and 47 of seal ring 28. Flange 51 in this example is formed integrally on shroud 45 while flange 53 is removably mounted on shroud 45. Formed in the flanges 51 and 53 are an O-ring receiving recess 55 and 57 which face the inner surface 49 of shroud 45 and face the radial surfaces 27 and 47 of seal ring 28, respectively. An O-ring 59 is mounted in O-ring receiving recess 55 of flange 51 and an O-ring 61 is mounted in O-ring receiving recess 57 of flange 53. Referring to FIG. 1A, it is clearly seen that seal ring 28 has its surface 43 closely adjacent to surface 49 of shroud 45 and the junction between ring 28 and shroud 45 is depicted by the reference numeral 63 for the left-hand junction on FIG. 1A and reference numeral 65 for the right-hand junction in FIG. 1A. The flanges 51 and 53 which form a part of shroud 45 each have provided in the O-ring recesses 55 and 57 thereof, inclined surfaces 67 and 69 which are positioned to respectively face the junctions 63 and 65 between shroud 45 and seal ring 28, as aforedescribed. The purpose of each of the inclined surfaces 67 and 69 is to provide a force vector which has force components in both the axial and radial directions toward the junctions 63 and 65. The force vectors are depicted by reference characters 71 and 73 and produce a positive seating force on O-rings 59 and 61 to ensure positive engagement of O-rings 59 and 61 with the radial surfaces 27 and 47 of seal ring 28, respectively, as well as positive engagement of the O-rings 59 and 61 with the axial surface 49 of shroud 45.

It will be noted that the outer surfaces of shroud 45 except that portion of axial surface 49 thereof located between the O-rings 59 and 61 are exposed to the high pressure region 17 of housing 15. However, the axial surface 43 of the seal ring is exposed to low pressure, while portions of surfaces 27, 37, 47 and the outer faces of projection 48 are exposed to high pressure. It is further noted that openings 74 and 75 are formed in flanges 51 and 53 to extend axially into O-ring receiving openings 55 and 57 to ensure that high pressure from the high pressure region 17 is acting on the adjacent surface of O-ring 59 and 61, respectively, in order to provide an axial force pushing the O-rings respectively into engagement with surfaces 27 and 47 of seal ring 28. Furthermore, openings in the radial direction identified by reference characters 77 and 79 are provided to ensure that high pressure from the high pressure region 17 is exerting on the adjacent surfaces of O-rings 59 and 61 through passageways 77 and 79 concurrently to urge O-rings 59 and 61 into positive engagement with surface 49 of shroud 45. In addition, clearances 91 and 93 exist between the O-rings and the lower axial surfaces of the O-ring recesses 55 and 57 to provide high pressure to the rings adjacent the inclined surfaces 67 and 69, respectively, to further urge the sealing of the O-rings as described.

It will be noted that seal ring 28 is provided with a plurality of circumferentially spaced radial openings or passageways 81 extending entirely therethrough (only one of which is shown in FIGS. 1 and 1A) and which extend from axial face 43 of seal ring 28 to axial face 37 of seal ring 28, but to that portion of axial face 37 which is at the low pressure side of seal 31. Thus, openings 81 provide a flow path for any leakage past O-rings 59 and 61 into the low pressure region of housing 15. The existence of low pressure in passageway 81 also provides a pressure drop across each of the O-rings 59 and 61 and ensures that high pressure on the high pressure sides of O-rings 59 and 61 urge the O-rings into positive contact with the adjacent surfaces of both shroud 45 and seal ring 28. In this manner, any variation in the size of the O-rings 59 and 61 is accommodated by the forces acting thereon to ensure a proper seal between the O-rings 59 and 61 against surfaces 27, 47 and 49 of the seal assembly 21. Inclined surfaces 67 and 69 further serve to move O-rings 59 and 61 into engagement with the aforementioned surfaces.

As heretofore mentioned, flange 53 of shroud 45 is removable (i.e., disparate) and is mounted in position by a snap ring 83 of conventional design, e.g., a split ring, positioned axially outwardly of flange 53 and received within a recess 85 in shroud 45. Interposed between snap ring 83 and flange 53 is a resilient means such as a wave spring 87 which is positioned to absorb any dimensional differences created in the manufacture of the parts of seal assembly 21. Thus, spring 87 provides a constant force on removable flange 53 in the axial direction and urging flange 53 toward seal ring 28 and further urging the O-rings 59 and 61 into engagement with surfaces 27, 47 and 49 of the seal assembly 21.

It will therefore be seen that with the improvements of this invention, it is unnecessary to manufacture certain of the parts of seal assembly 21, such as seal ring 28, O-rings 59 and 61, and shroud 47 to extremely high dimensional tolerances since any variation in sizes will be absorbed by spring 87 and by the inclined surfaces 67 and 69 located within the O-ring receiving grooves.

It should be further noted that stiffening members 89 project outwardly from shroud 45 to increase the rigidity of shroud 45 so that the latter will not deflect to any significant degree during operation. Thus, the seal ring 28 is provided to be received within a shroud assembly 45 not only to prevent distortion of seal ring 28 and distortion of the position of sealing surface 27 of seal ring 28 during operation in high pressure difference environments, but also to prevent distortion of seal ring 28 by virtue of excessive forces which could be created by, for example, variation in the size of O-rings 59 and 61 during assembly of the components of seal assembly 21.

It will be appreciated that this invention is directed to providing for the reduction of possible distortion of deformable seal members located in high pressure environments by the use of a stiff shroud which absorbs the pressure on the high pressure side of the deformable seal ring and through the use of means for positively sealing surfaces of the shroud and seal ring in both the axial and radial directions to prevent any significant leakage along the interface between the shroud and the seal ring, while concurrently including means for absorbing any dimensional variations caused in the manufacture of the components of seal assembly 21. This invention is applicable to seal assemblies not only of the dry gas seal type illustrated herein, but of other types wherein the prevention of deformation of a seal member is desired. It will be understood therefore, that the above-discussed embodiment is illustrative of this invention and is not intended to be limiting thereof.

I claim:

1. In a high pressure seal system for a rotating shaft, a solid seal ring of annular configuration having two generally parallelly extending radial surfaces and two generally parallelly extending axial surfaces, said seal ring being formed from a material which is subject to distortion when subjected to high pressure differences across it, one of each of said radial surfaces and said axial surfaces having a sealing face thereon, and the other of each of said radial and axial surfaces adapted to be exposed entirely to the high system pressure during operation, means for minimizing distortion of said seal ring including a stiff ring-shaped shroud having one surface thereof positioned closely adjacent but with a clearance with the other of said axial surfaces, said shroud also overlying only a portion of each of said radial surfaces which portion is located adjacent said other axial surface, said shroud having an O-ring receiving recess in each of said portions thereof that overlie said radial surface portions, an O-ring in each of said recesses, and means in each of said O-ring receiving recesses for urging the O-ring therein into positive engagement with the adjacent radial surface portion of said seal ring respectively and concurrently into positive engagement with said one surface of said shroud to minimize leakage past said O-rings to said other axial surface.

2. The high pressure seal system of claim 1 wherein a portion of said one axial surface is exposed only to a low pressure region during operation, and at least one axial opening extending through said seal ring from said other axial surface to said one axial surface portion to conduct any leakage of system fluid from said other axial surface to said low pressure region.

3. The seal system of claim 1 wherein said urging means in each of said O-ring receiving recesses comprises an inclined surface disposed generally opposite to said one surface of said shroud and which faces the junction between the adjacent radial ring surface portion and said one surface of said shroud respectively.

4. The seal system of claim 3 wherein said shroud includes an opening therethrough for conducting system pressure to the side of each of said O-rings located between said urging means and the portion of each of said O-rings engaging said one surface of said shroud.

5. The seal system of claim 1 wherein one of said sides of said shroud which overlies one of said radial surfaces being disparate and removable, and a snap ring interacting between said one disparate side of said shroud and the remainder of said shroud for holding said one disparate side in position.

6. The seal system of claim 5 including resilient means positioned between said snap ring and said one disparate side of said shroud to absorb any clearance between said one side of said shroud and said snap ring.

7. The seal system of claim 4 wherein said shroud is formed to conduct high pressure system fluid to act against each of said O-rings at a position on said O-rings between said urging means and the portion of said O-rings engaging said radial sides of said seal ring, respectively.

8. A mechanical seal assembly for substantially preventing the flow of fluid along a rotatable shaft from a high pressure region to a lower pressure region and associated with a rotatable shaft and a stationary housing, said assembly comprising a stationary seal ring mounted in said housing and having two generally parallel radially extending surfaces and two generally parallel axially extending surfaces, one of said ring surfaces having a sealing face positioned to coact with a face on a seal runner on the shaft and moving therewith, so that a sealing action occurs between the seal runner and the seal ring which creates a high pressure drop across said seal ring, a stiff annular shroud having an annular recess formed therein so that said recess has an inward surface, said seal ring having the one of its radially extending surfaces which is located on the high pressure side of said housing received in said shroud member and positioned closely adjacent but with a clearance with the inward surface of said recess so that the high pressure acts on the shroud and not on said one axial surface of said seal ring, said shroud having a radially extended flange extending inwardly from each end thereof and overlying a portion of each of the radial surfaces of said seal ring located adjacent said one axial surface thereof, respectively, each of said flanges terminating in a radially extending projection which underlies a portion of said shroud and forms an O-ring receiving cavity between the ends of each flange facing the adjacent radial surface portion, an O-ring mounted in each cavity, means urging said O-rings into positive engagement with said adjacent radial surface portions and into positive engagement with said inward surface of said recess, said means including an inclined surface in each of said O-ring recesses positioned to face the junction between said one radial surface of said ring and said inward surface of said recess, respectively.

9. The mechanical seal assembly of claim 8 wherein said ring having a passageway extending therethrough from a surface of said ring located in the lower pressure region of said housing when said seal ring is in operation to said one radial surface of said ring to conduct any leakage past said O-rings to said one radial surface of said ring to said lower pressure region of said housing.

* * * * *